Oct. 10, 1961      J. A. MacKENZIE      3,003,600
CONSTRUCTIONAL ELEMENT
Filed April 10, 1958      5 Sheets-Sheet 1
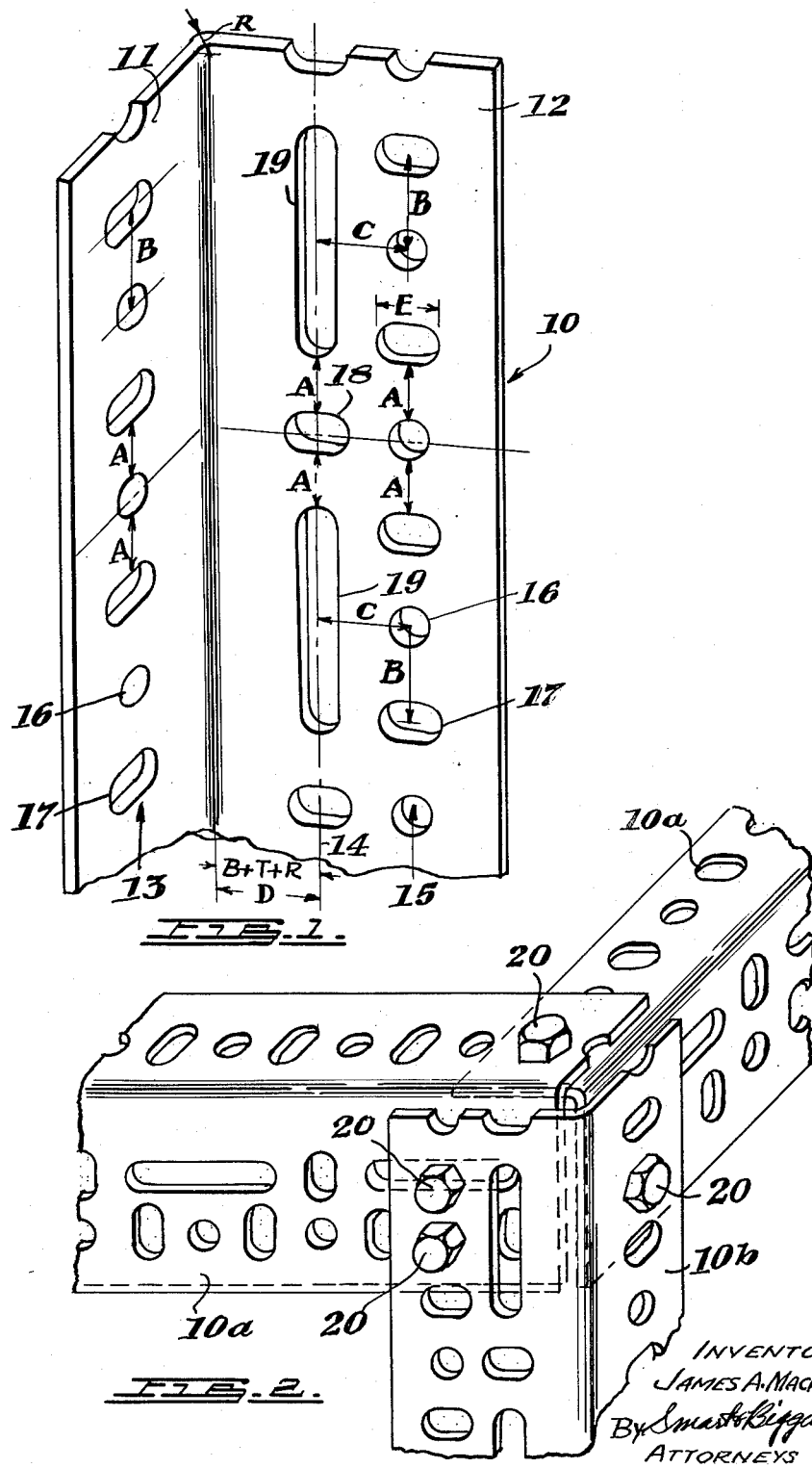
INVENTOR
JAMES A. MACKENZIE
By Smart&Biggar
ATTORNEYS

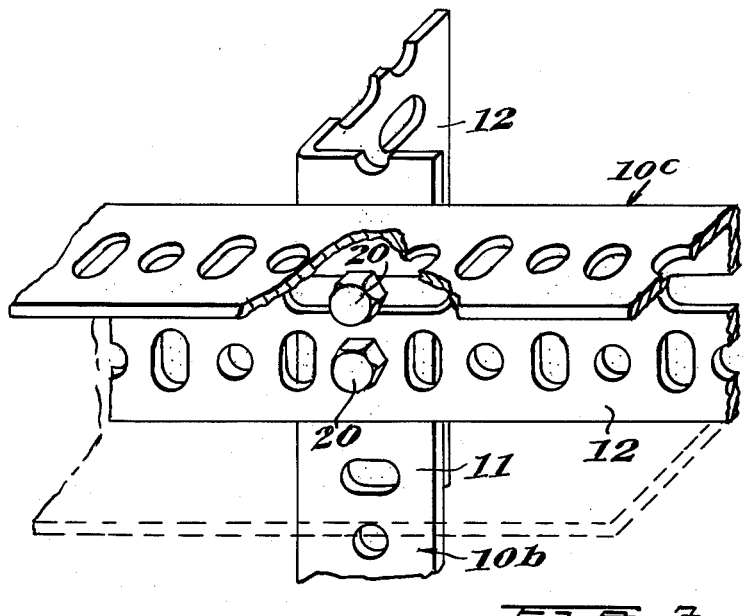
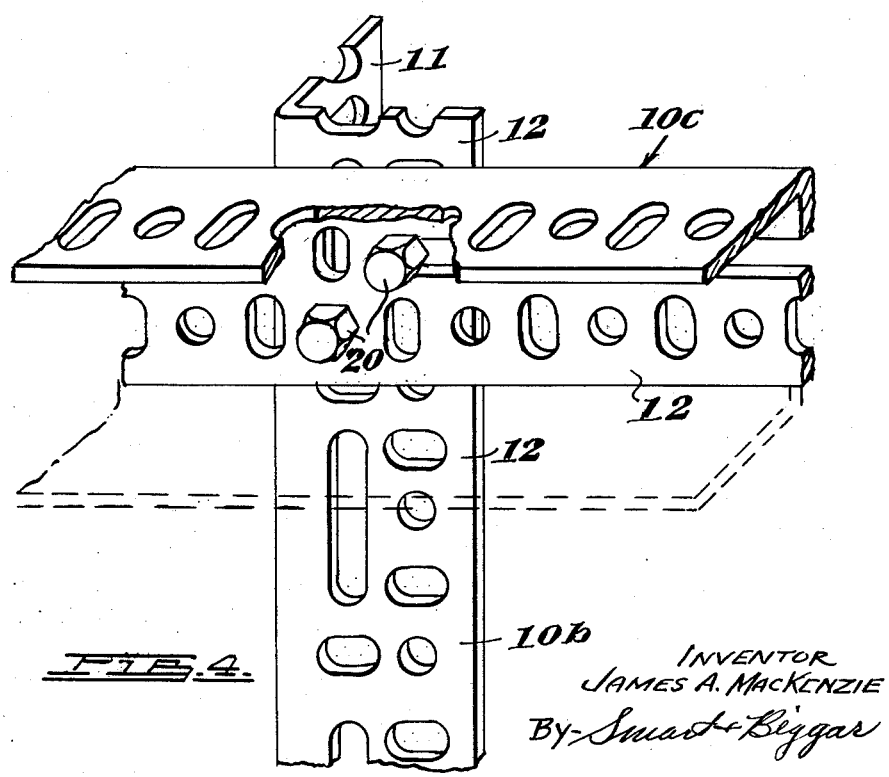

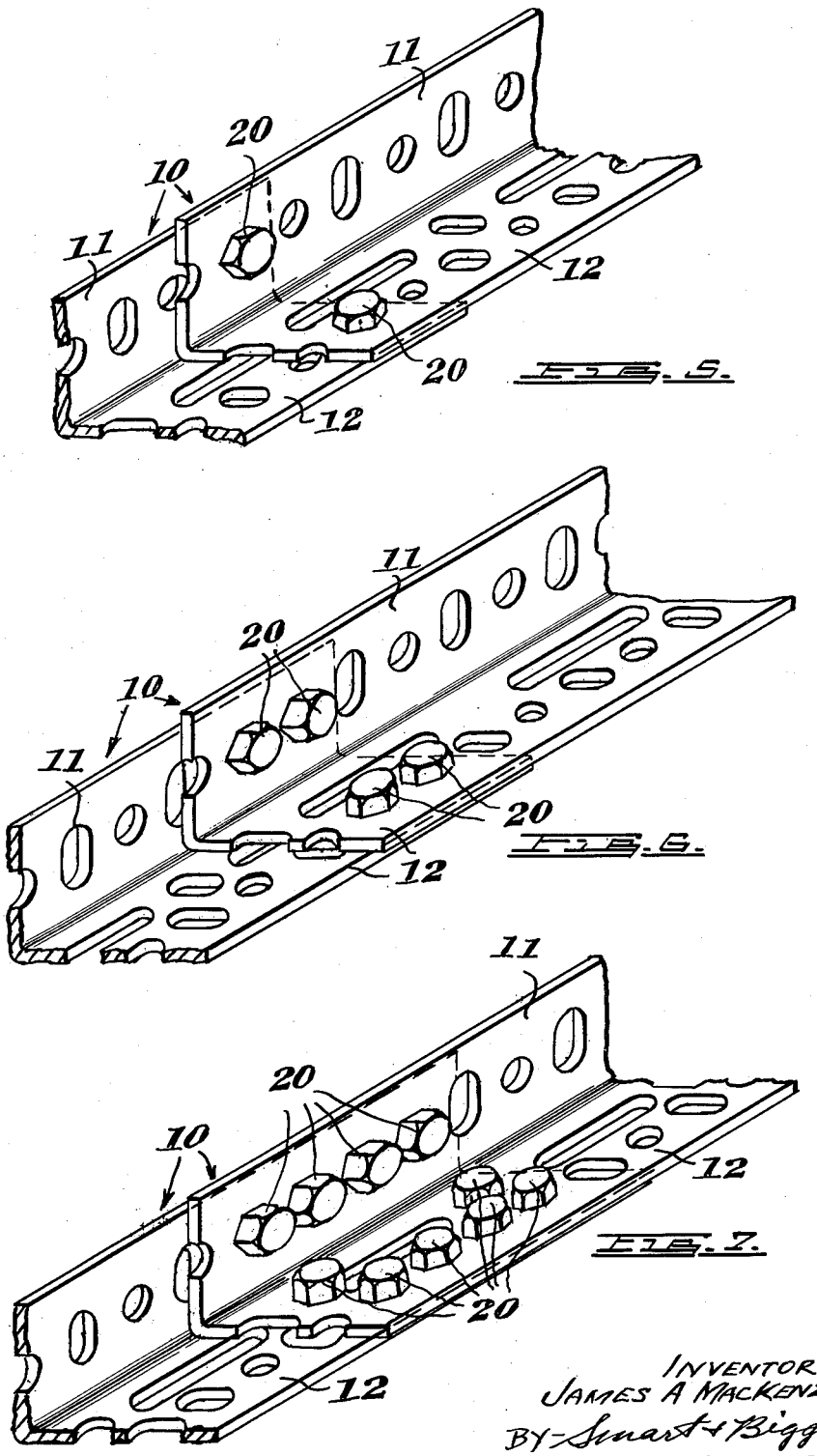

Oct. 10, 1961  J. A. MacKENZIE  3,003,600
CONSTRUCTIONAL ELEMENT
Filed April 10, 1958  5 Sheets-Sheet 4
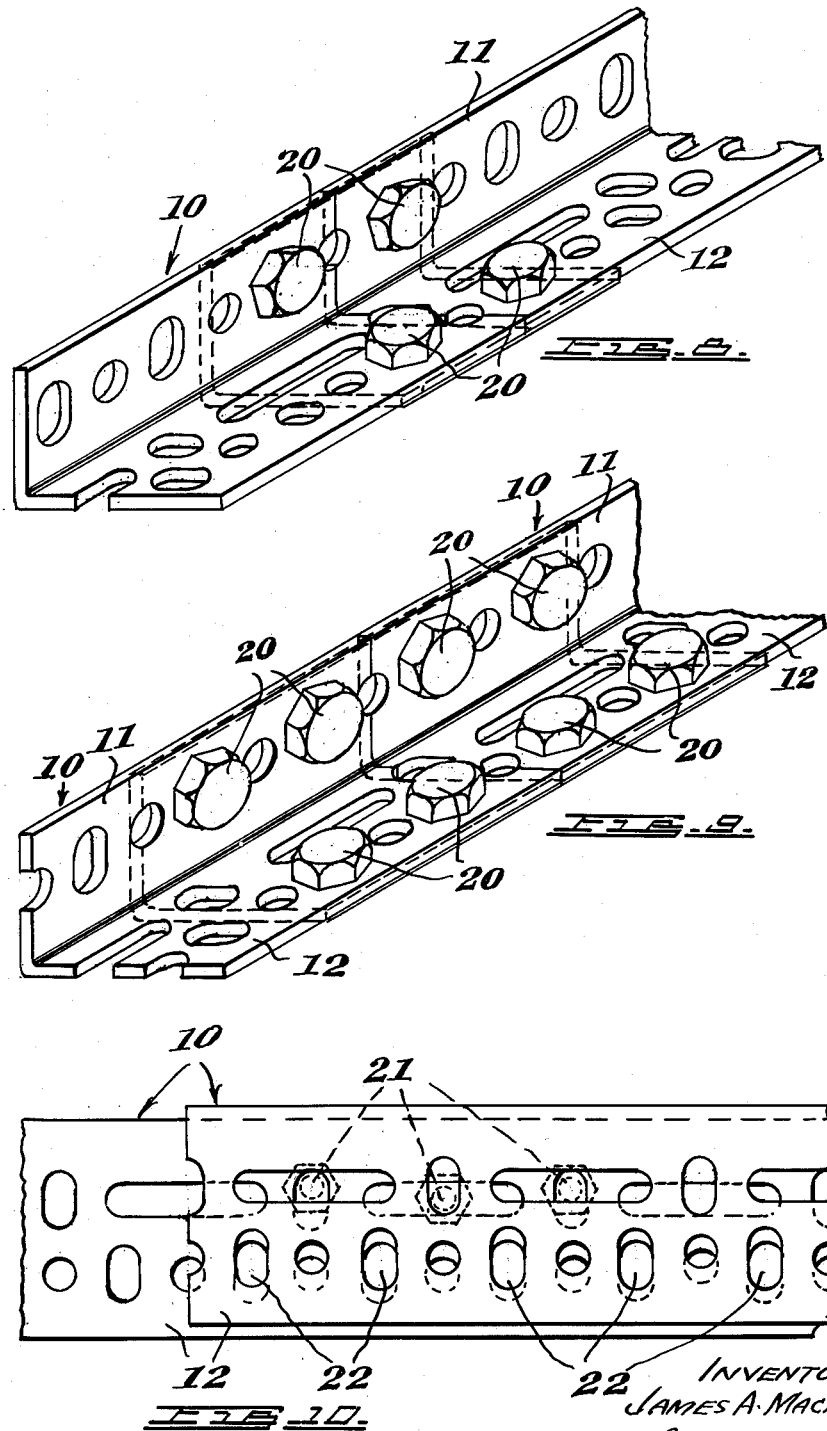
INVENTOR
JAMES A. MACKENZIE
By- Smart & Biggar
ATTORNEYS.

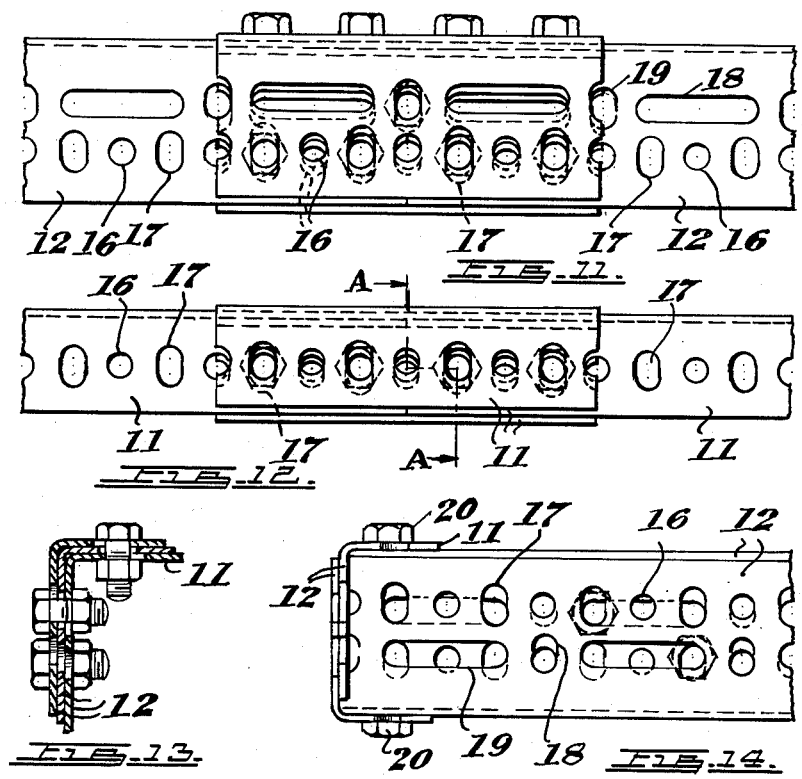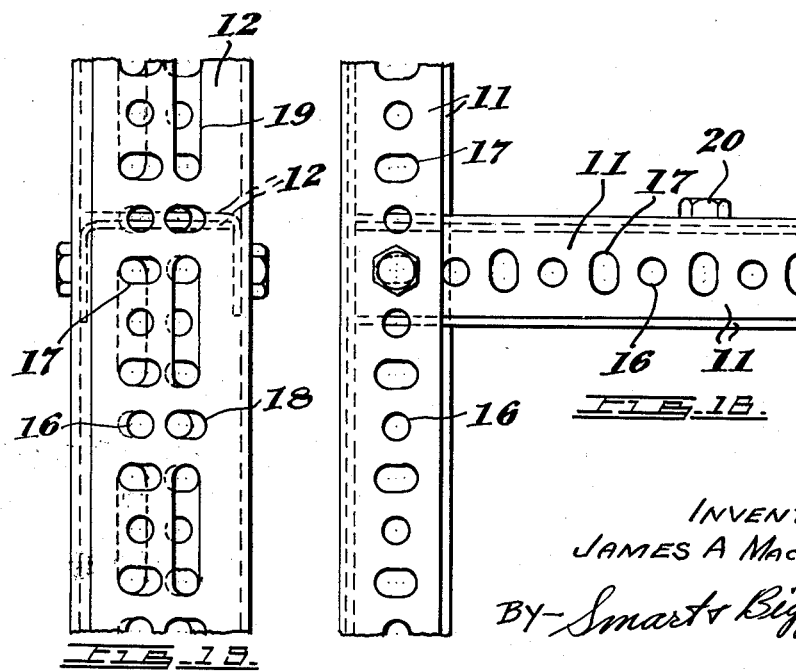

3,003,600
Patented Oct. 10, 1961

3,003,600
CONSTRUCTIONAL ELEMENT
James A. MacKenzie, 433 Echo Drive,
Ottawa, Ontario, Canada
Filed Apr. 10, 1958, Ser. No. 727,562
4 Claims. (Cl. 189—34)

This invention relates to constructional elements of L-shaped cross-section having lines of regularly spaced slots or holes provided in the flanges of the section. Elements of this nature, cut to appropriate lengths, may be bolted together by taking advantage of the slots or holes, to form a variety of frames and structures.

The present invention is an improvement upon my United States Patent No. 2,632,533, Constructional Element, dated March 24, 1953.

In my said earlier patent I disclosed a constructional element of constant thickness and of L-shaped cross-section having a narrow flange and a wide flange, a row of holes extending longitudinally of the narrow flange, and two rows of holes extending longitudinally of the wide flange, the minimum distance between the adjacent edges of adjacent holes in each row being the same throughout each row, said distance being the same in the case of each of the three rows, the row of holes in the narrow flange and the two rows of holes in the wide flange being repetitions of one another and each consisting of a plurality of alternate round and elongated holes, the round holes all being of the same size, the elongated holes all being of the same diameter, said elongated holes being elongated transversely of the element, said elongated holes being of a width equal to the diameter of one of the round holes and of a length equal to the diameter of one of the round holes plus twice the thickness of the element, the round holes in any given row of holes being transversely aligned with the elongated holes in the next adjacent row of holes.

I have now found that the element of my earlier patent can be rendered substantially more versatile by radically changing the number, shape, and arrangement of holes in the inner row of holes in the said wide flange; and in the L-shaped element of the present invention the said row consists of a plurality of holes which are alternately elongated transversely and longitudinally of the member, the transversely elongated holes being similar in size to the transversely elongated holes in the other two rows and the longitudinally elongated hole being of the same width as one of the round holes in the other two rows and of a length at least as great as the centre-to-centre distance between two of the transversely elongated holes in one of said other rows plus the diameter of one of said round holes.

Summarizing the foregoing, my present invention may be generally defined as a constructional element of constant thickness and of L-shaped cross-section having a narrow flange and wide flange, a row of holes extending longitudinally of the narrow flange, and two rows of holes extending longitudinally of the wide flange, the minimum distance between the adjacent edges of adjacent holes in each row being the same throughout each row, said distance being the same in the case of each of the three rows, the row of holes in the narrow flange and the outer of the two rows of holes in the wide flange being transversely aligned repetitions of one another and each consisting of a plurality of alternate round and elongated holes, the round holes all being of the same diameter, the elongated holes all being of the same size, said elongated holes being elongated substantially transversely of the element, said elongated holes being of a width equal to the diameter of one of the round holes and of a length equal to the diameter of one of the round holes plus twice the thickness of the element, the inner row of holes in the wide flange consisting of alternate substantially transversely elongated and longitudinally elongated holes, the substantially transversely elongated holes in said inner row being of the same size as the substantially transversely elongated holes in said outer row, one such substantially transversely elongated hole in the inner row being transversely aligned with every second round hole in said outer row, each of the longitudinally elongated holes being, over most of its length, equal in width to the diameter of one of said round holes and at least as long as the centre-to-centre distance between two of said substantially transversely elongated holes in said outer row plus the diameter of one of said round holes.

In drawings which illustrate the presently preferred embodiment of my invention:
FIGURE 1 is a perspective view of a length of the constructional element,
FIGURES 2, 3, and 4 are perspective views illustrating various arrangements whereby two or more of the elements of FIGURE 1 may be joined to one another in the construction of a load-supporting member,
FIGURES 5, 6, and 7 are perspective views illustrating different overlapped splices of two of the elements,
FIGURES 8 and 9 are perspective views illustrating two different butt splices,
FIGURE 10 is a plan view illustrating the mutual adjustability available where two nested elements are to be bolted to one another,
FIGURES 11 and 12 are elevation and plan views respectively of three pieces of the element in nesting position,
FIGURE 13 is a section on the stoppered line A—A of FIGURE 12 looking in the direction of the arrows, and
FIGURES 14, 15 and 16 are plan, elevation, and end elevation respectively of a T section.

Turning now to FIGURE 1 and considering the element there illustrated in detail, the constructional element generally indicated by reference number 10 is of constant thickness (gauge) and is made up of a narrow flange 11 and a wide flange 12. A row of holes 13 extends longitudinally of the narrow flange 11 and an inner row of holes 14 and an outer row of holes 15 extends longitudinally of the wide flange 12. The minimum distance A between the adjacent holes in each row is the same throughout each row, said distance A being the same in each of said rows 13, 14 and 15. Rows of holes 13 and 15 are transversely aligned repetitions of one another, each of said rows consisting of a plurality of round holes 16 and elongated holes 17. The round holes 16 are all of the same diameter; and the elongated holes 17 are all of the same size and are all elongated transversely of the element. The elongated holes 17 are of a width equal to the diameter of one of the round holes 16 and of a length E equal to the diameter of one of said round holes plus twice the thickness T of the element 10.

The inner row of holes 14 consists of alternate transversely elongated holes 18 and longitudinally elongated holes 19. The transversely elongated holes 18 are exactly the same as the transversely elongated holes 17 in rows 13 and 15, and a hole 18 is transversely aligned with every second round hole 16 in row 15. The longitudinally elongated holes 19 are equal in width to the diameter of one of the round holes 16 and are of a length at least as long as (and are preferably equal in length to) the centre-to-centre distance between two of the holes 17 in row 15 plus the diameter of one of the holes 16.

In addition to the foregoing the illustrated presently preferred embodiment of the invention has the following three features:

(1) The centres of all the holes 16 and 17 in line 13 lie in a straight line; and the same may be said of all the holes 18 and 19 in line 14 and 16 and 17 in line 15.

(2) The wide flange 12 is substantially one and a half times as wide as the narrow flange 11.

(3) The centre-to-centre distance B between holes 16 and 17 in rows 13 and 15 are equal to the centre-to-centre distance C between the elongated holes 19 in row 14 and those round holes 16 in outer row 15 which are transversely aligned with said elongated holes 19.

It will be noted that the radius of the joint between the flanges 11 and 12 is denoted by R and that the row of holes 14 is spaced from the inside edge of the flange 11 by a distance D equal to the dimension B plus the thickness of the material T plus the radius R. As may be noted from FIGURES 1 and 2, the row of holes 13 in the narrow flange 11 is similarly spaced from the inside edge of the wide flange 12.

FIGURE 2 illustrates a three-way corner joint wherein two horizontal members 10a are carried by a vertical member 10b. The joint has excellent rigidity since all the bolts 20 which have been illustrated will be in bearing when the completed structure is loaded.

FIGURES 3 and 4 illustrate the hanging of a channel-shaped horizontal member 10c constructed from two of the elements 10 on (a) the narrow flange 11, and (b) the wide flange 12, of a vertical element 10b, respectively. In each case excellent strength is achieved in the connection since each of the bolts 20 which has been illustrated will be in bearing when the completed structure is loaded.

FIGURES 5, 6, and 7 illustrate various overlap splices using two elements 10 wherein the wide flange 12 is about 2.4 inches wide, the narrow flange 11 about 1.6 inches wide, the distances B and C both 0.75 inch and the distance A about 0.37 inch. With such elements and with 1½ inches of overlap (the case of FIGURE 5) it is possible to join the elements with two bolts 20 which are of a diameter approximating that of the round holes. In the case of FIGURE 6 where a 2¼ inch overlap is employed four such bolts may be passed through the aligned holes; and in the case of FIGURE 7 where a 3¾ inch overlap is employed 10 such bolts may be passed through the aligned holes. It will be appreciated that, in each of the joints just described, the bolts of diameter approximating that of the round holes 16 may be passed through the holes as illustrated despite the misalignment of the rows of holes occasioned by the thickness of the flanges of the nested elements, because, and only because, of the defined transverse elongation of the holes 17 and 18.

The defined arrangement of the holes also facilitates butt splicing of two of the elements by means of very short lengths of a third element of exactly similar form. Thus, for example, as illustrated in FIGURES 8 and 9, with elements of the same as those described in connection with FIGURES 5–7 and with bolts of approximately the same diameter as that of the round holes 16, a three-inch length of the overlapped third element permits single bolting of each flange of each of the abutted elements to the third element (as shown in FIGURE 8); while a six inch length of the overlapped third element provides for double bolting of each flange of each of the abutted elements to the overlapping element (as shown in FIGURE 9).

FIGURE 10 illustrates the wide range of mutual adjustability which is available when bolting two overlapped elements to one another. This adjustability is of great importance since there is often a call for an element of an exact length, which length can be secured by overlapping and bolting together two or more of the elements 10. Bolts inserted at the points 21 in row 14 provide for variable adjustment of any amount up to 1½ inches while bolts inserted through holes in line 15 at the points indicated by reference numeral 22 will provide a fixed adjustment at ¾ inch intervals; when both the elements illustrated in FIGURE 10 are of the same size as the elements described in connection with FIGURES 5–7.

The nesting arrangement as shown in FIGURES 11, 12 and 13 illustrates a splice which is possible with the element in accordance with this invention. This splice would have a fairly common application, for example where a load is to be hung from the structure either in a vertical or a horizontal position but particularly in a vertical position. This construction produces a very strong resistance to shear on the bolts.

The T joint as illustrated in FIGURES 14, 15 and 16 comprises the joint arrangement of two channel sections, each channel section being made up from two elements in accordance with the present invention. In order to fit the two channel sections together the upstanding or receiving channel is expanded and the channel to be inserted is compressed. This expansion and compression is due to the provision of the elongated hole 17.

What I claim as my invention is:

1. A constructional element of constant thickness and of L-shaped cross-section having a narrow flange and a wide flange, said flanges being integrally connected by a joint of small radius, a row of holes extending longitudinally of the narrow flange, and two rows of holes extending longitudinally of the wide flange, the minimum distance between the adjacent edges of adjacent holes in each row being the same throughout each row, said distance being the same in the case of each of the three rows, the row of holes in the narrow flange and the outer of the two rows of holes in the wide flange being transversely aligned repetitions of one another and each consisting of a plurality of alternate round and elongated holes, the round holes all being of the same diameter, the elongated holes all being of the same size, said elongated holes being elongated substantially transversely of the element, said elongated holes being of a width equal to the diameter of one of the round holes and of a length equal to the diameter of one of the round holes plus twice the thickness of the element, the inner row of holes in the wide flange consisting of alternate substantially transversely elongated and longitudinally elongated holes, the substantially transversely elongated holes in said inner row being of the same size as the substantially transversely elongated holes in said outer row, one such substantially transversely elongated hole in the inner row being transversely aligned with every second round hole in said outer row, each of the longitudinally elongated holes being, over most of its length, equal in width to the diameter of one of said round holes and at least as long as the centre-to-centre distance between two of said substantially transversely elongated holes in said outer row plus the diameter of one of said round holes, the centres of all the holes in each row lying in a straight line which is parallel to the longitudinal axis of the element, a line drawn through the centres of said row of holes in the narrow flange being at the same distance from the wide flange as a line drawn through the centres of the inner row of holes in the wide flange is from said narrow flange, said distance being substantially equal to the sum of (1) the centre-to-centre distance between adjacent holes in said outer row, (2) the thickness of the element, and (3) the radius of the joint between the flanges.

2. A constructional element as defined in claim 1, in which said wide flange is substantially one and a half times the width of the narrow flange.

3. A constructional element as defined in claim 1, in which the said longitudinally elongated holes are equal in length to the centre-to-centre distance between two of said substantially transversely elongated holes in said outer row plus the diameter of one of said round holes.

4. A constructional element as defined in claim 1, in which the centre-to-centre distance between adjacent holes in said narrow flange and in the outer row in said wide flange is equal to the centre-to-centre distance between the longitudinally elongated holes in said inner row and the round holes which are transversely aligned with said longitudinally elongated holes.

References Cited in the file of this patent

UNITED STATES PATENTS 2,632,533 MacKenzie _____ Mar. 24, 1953

FOREIGN PATENTS 82,093 Denmark _____ Oct. 22, 1956
1,099,299 France _____ Mar. 16, 1955